United States Patent
Piernot (10) Patent No.: US 9,058,399 B2
(45) Date of Patent: Jun. 16, 2015

(54) SYSTEM AND METHOD FOR PROVIDING NETWORK RESOURCE IDENTIFIER SHORTENING SERVICE TO COMPUTING DEVICES

(75) Inventor: Philippe P. Piernot, Palo Alto, CA (US)

(73) Assignee: Unwired Planet, LLC, Reno, NV (US)

(*) Notice: Subject to any disclaimer, the term of this patent is extended or adjusted under 35 U.S.C. 154(b) by 181 days.

(21) Appl. No.: 13/192,841

(22) Filed: Jul. 28, 2011

(65) Prior Publication Data

US 2012/0030359 A1 Feb. 2, 2012

Related U.S. Application Data (60) Provisional application No. 61/368,341, filed on Jul. 28, 2010.

(51) Int. Cl.
*G06F 17/30* (2006.01)
*H04L 29/08* (2006.01)

(52) U.S. Cl.
CPC .......... *G06F 17/30887* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 2002/0065938 A1 | 5/2002 | Jungck et al. | |
| 2003/0126198 A1 | 7/2003 | Tenereillo et al. | |
| 2004/0233930 A1 | 11/2004 | Colby, Jr. | |
| 2004/0267961 A1 | 12/2004 | Dietz et al. | |
| 2006/0031942 A1* | 2/2006 | Jones et al. | 726/27 |
| 2007/0016949 A1 | 1/2007 | Dunagan et al. | |
| 2007/0124414 A1 | 5/2007 | Bedingfield, Sr. et al. | |
| 2007/0124500 A1 | 5/2007 | Bedingfield, Sr. et al. | |
| 2007/0136279 A1* | 6/2007 | Zhou et al. | 707/6 |
| 2009/0070873 A1* | 3/2009 | McAfee et al. | 726/23 |
| 2010/0268739 A1* | 10/2010 | Zalepa | 707/782 |

OTHER PUBLICATIONS

Ziqing Mao and Cormac Herley, "A Robust Link-Translating Proxy Server Mirroring the Whole Web," SAC' 10, Mar. 22-26, 2010, Sierre, Switzerland.
International Search Report and Written Opinion, PCT/US2011/045709, Jul. 28, 2011.
International Search Report and Written Opinion, PCT/US2011/045683, Jul. 28, 2011.

* cited by examiner

*Primary Examiner* — Huy D Vu
*Assistant Examiner* — Bao G Nguyen (57) ABSTRACT

A system and method for providing shortened network resource identifier service to computing devices uses a link translating technique to replace at least some of the links in network resources requested by the computing devices using shortened network resource identifiers so that network activities of the computing devices can be monitored or controlled.

22 Claims, 4 Drawing Sheets

SYSTEM AND METHOD FOR PROVIDING NETWORK RESOURCE IDENTIFIER SHORTENING SERVICE TO COMPUTING DEVICES

CROSS-REFERENCE TO RELATED APPLICATION

This application is entitled to the benefit of provisional U.S. patent application Ser. No. 61/368,341, filed Jul. 28, 2010, which is incorporated herein by reference.

BACKGROUND

Uniform Resource Locators (URLs) are widely used as "addresses" to access resources on the Internet, such as web pages and other contents stored at various websites. A concern with URLs is that some URLs can be very long due to complex descriptive attributes that are sometimes included in the URLs. As a result, some URLs can be difficult to remember and visually unappealing. In addition, due to the total character limits on some messaging services, users may be unable to fit one or more of URLs in their messages, which can frustrate the users of these messaging services. Such URLs can also be truncated or broken up by some messaging applications such as email clients.

One way to alleviate the above concerns is to use URL shortening, which is a technique of making Web contents available under substitute URLs that are much shorter than the original URLs. Thus, these substitute or shortened URLs can be used instead of the long, original URLs to access the desired web contents. Since the shortened URLs are typically much shorter than the original URLs, the shortened URLs can be easier to remember, visually more appealing and more easily inserted in messages. Currently, various companies provide URL shortening services that redirect requests using shortened URLs to their intended destinations, i.e., resources defined in the original URLs.

Most URL shortening service providers use 301 or 302 HTTP redirects to redirect requests using shortened URLs to their intended destinations. Thus, the URL shortening services providers loose control over subsequent user web activities. Consequently, the URL shortening service providers cannot mediate and/or control web-browsing traffic beyond the first click, i.e., the click using the shortened URL, which significantly limits information gathering and/or further service providing capabilities of the URL shortening service providers.

In view of the limitations of the current URL shortening services, there is a need for a system and method for controlling web-browsing activities of URL shortening service users.

SUMMARY

A system and method for providing shortened network resource identifier service to computing devices uses a link translating technique to replace at least some of the links in network resources requested by the computing devices using shortened network resource identifiers so that network activities of the computing devices can be monitored or controlled. The link translating technique can be repeatedly applied to subsequent requests for network resources using either shortened network resource identifiers or replacement links to continually monitor or control the network activities of the computing devices.

A system for providing network resource identifier shortening service to computing devices in accordance with an embodiment of the invention comprises at least one server operably connected to the computing devices and a network. The at least server is configured to process data transmissions between the computing devices and the network. The at least one server comprises a shortened network resource identifier expansion module and a link translating module. The shortened network resource identifier expansion module is configured to receive requests for network resources using shortened network resource identifiers from the computing devices and to fetch the network resources using original network resource identifiers that correspond to the shortened network resource identifiers. The link translating module is operably connected to the shortened network resource identifier expansion module. The link translating module is configured to receive the fetched network resources and to perform a link translating operation on the fetched network resources to replace at least some original links of network resource identifiers in the fetched network resources with replacement links of network resource identifiers. The replacement links of network resource identifiers is configured to direct requests for network resources from the computing devices using the replacement links of network resource identifiers to the at least one server for processing so that network activities of the requesting computing devices can be monitored or controlled. The fetched network resources are transmitted to the computing devices requesting the fetched network resources after the link translating operation has been performed on the fetched network resources.

A method for providing network resource identifier shortening service to computing devices in accordance with an embodiment of the invention comprises receiving requests for network resources using shortened network resource identifiers from the computing devices at a mediation system that includes at least one server, fetching the network resources from a network using original network resource identifiers that correspond to the shortened network resource identifiers, receiving the fetched network resources at the mediation system, performing a link translating operation on the fetched network resources to replace at least some original links of network resource identifiers in the fetched network resources with replacement links of network resource identifiers, the replacement links of network resource identifiers being configured to direct requests for network resources from the computing devices using the links of replacement network resource identifiers to the mediation system for processing so that network activities of the computing devices can be monitored or controlled, and transmitting the fetched network resources to the computing devices requesting the fetched network resources after the link translating operation has been performed on the fetched network resources.

A method for providing Uniform Resource Locator (URL) shortening service to computing devices in accordance with an embodiment of the invention comprises receiving requests for network resources using shortened URLs from the computing devices at a mediation system that includes at least one server, fetching the network resources from a network using original URLs that correspond to the shortened URLs, receiving the fetched network resources at the mediation system, performing a link translating operation on the fetched network resources to replace at least some original links of URLs in the fetched network resources with replacement links of URLs, the replacement links of URLs being configured to direct requests for network resources from the computing devices using the replacement links of URLs to the mediation system for processing so that network activities of the computing devices can be monitored or controlled, and transmitting the fetched network resources to the computing devices requesting the fetched network resources after the link translating operation has been performed on the fetched network resources.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
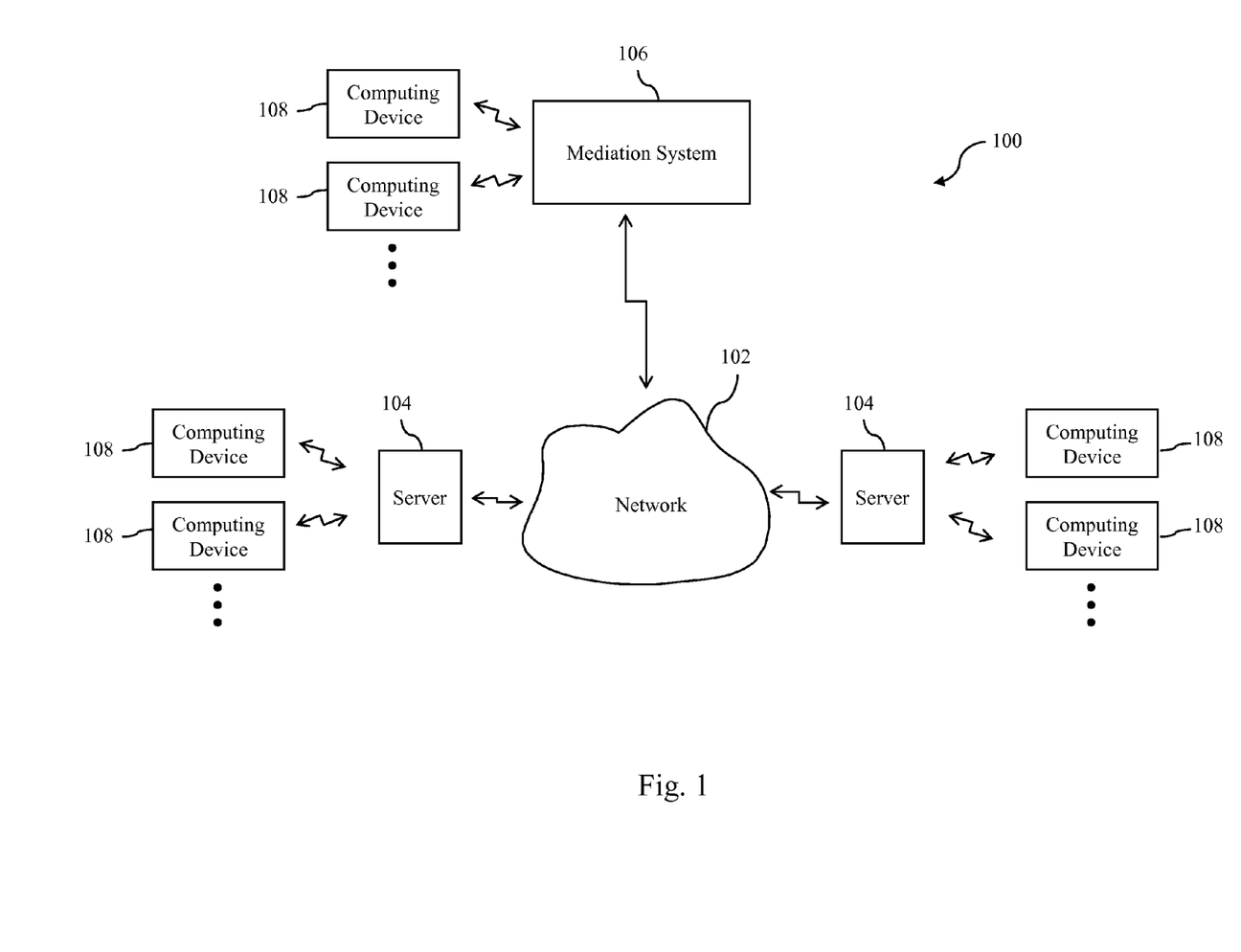
FIG. 1 is a block diagram of a communication network system in accordance with an embodiment of the invention.

Turning now to FIG. 1, a communication network system 100 in accordance with an embodiment of the invention is shown. As shown in FIG. 1, the communication network system includes a network 102, a number of servers 104 and a mediation system 106. In some embodiments, the network is the Internet. However, in other embodiments, the network can be any type of computer networks. The servers may provide network resources, such as webpages and multimedia contents, and/or provide access to the network for various computing devices 108 connected to the servers. The mediation system may also provide access to the network for various computing devices connected to the mediation system. The computing devices can be any type of network-enabled devices. As an example, the computing devices may be desktop computers, notebook computers and/or Internet-enabled mobile devices. In some embodiments, the computing devices may utilize web browser or other web browsing applications to access the network via the servers or the mediation system. As described in more detail below, the mediation system also provides network resource identifier shortening service for the computing devices. The mediation system can monitor network activities of the computing devices and/or control contents transmitted to the computing devices. Thus, the mediation system can provide valuable targeted or customized services to the computing devices depending on the network activities of the computing devices.

Although not illustrated, the communication network system 100 may include additional servers and components commonly used to access a network, such as the Internet, and/or to provide services related the network access. These additional servers and components are not illustrated and described herein so as to not obscure the inventive features of the communication network system.

Figure 2:
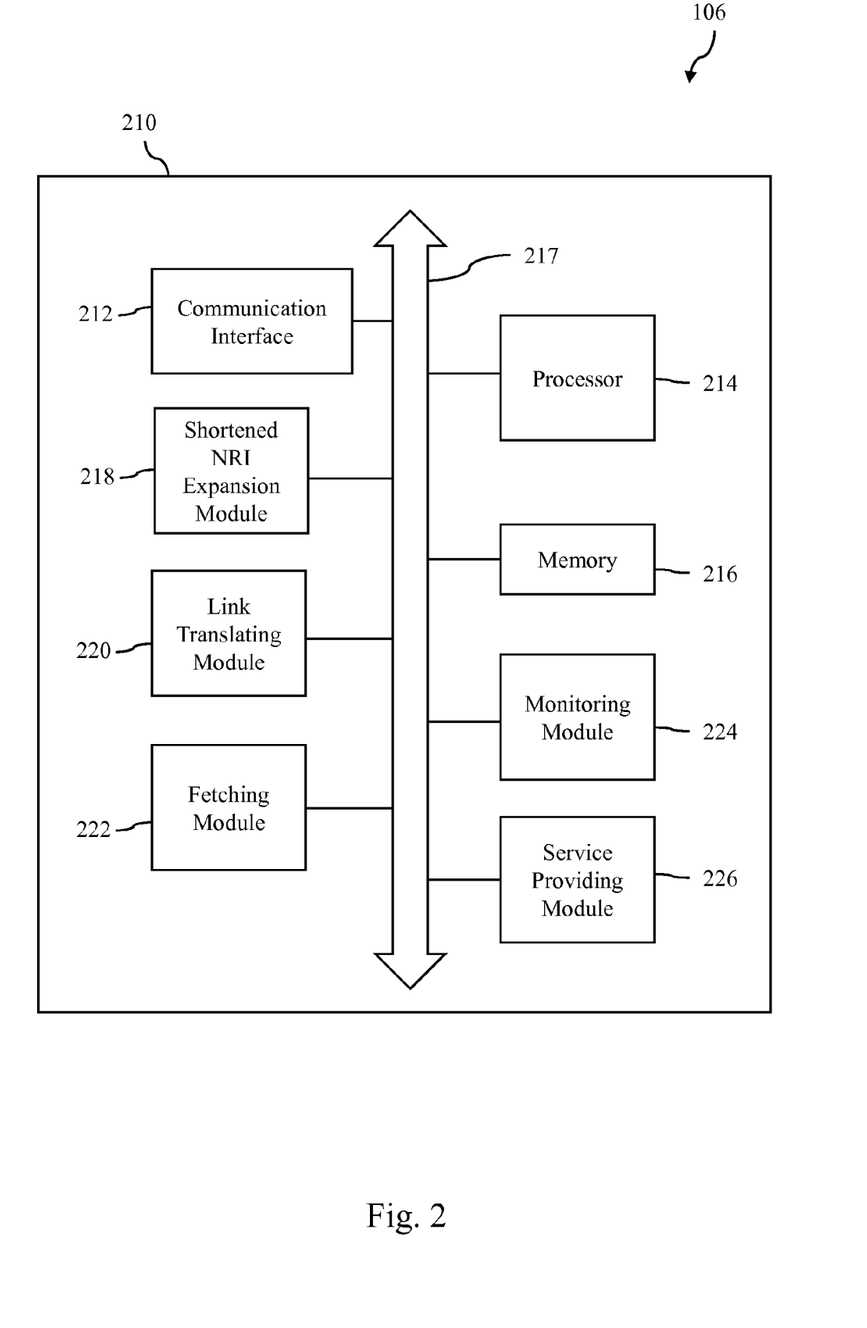
FIG. 2 is a block diagram of a mediation system in the communication network system of FIG. 1 in accordance with an embodiment of the invention.

Turning now to FIG. 2, components of the mediation system 106 in accordance with an embodiment of the invention are illustrated. As shown in FIG. 2, the mediation system includes at least one server 210, which includes a communication interface 212, at least one processor 214 and at least one memory 216 that are connected to a data bus 217. The communication interface enables communications with other devices, such as the computing devices 108 and servers 104 shown in FIG. 1, via, for example, Internet Protocol (IP). The processor may include a multifunction processor and/or an application-specific processor. The processor can be any processor commonly found in a server. The memory can be any type of computer memory, such as read only memory (ROM), flash memory, random access memory (RAM) or a hard disk drive.

The mediation system 106 further includes a shortened network resource identifier (NRI) expansion module 218, a link translating module 220, a fetching module 222, a monitoring module 224, and a service providing module 226, which are connected to the data bus 217. In an embodiment, the shortened NRI expansion module, the link translating module, the fetching module, the monitoring module and the service providing module are implemented as software stored in a computer readable medium, such as the memory 216, which is executed by the processor 214 to perform the functions of these module. However, in other embodiments, each of the shortened NRI expansion module, the link translating module, the fetching module, the monitoring module and the service providing module may be implemented in any combination of software, firmware and hardware. Although the shortened NRI expansion module, the link translating module, the fetching module, the monitoring module and the service providing module are shown as residing in a single server, one or more of these modules may reside in other servers of the mediation system 106 in other embodiments.

The shortened NRI expansion module 218 is configured to provide NRI shortening service for the computing devices 108. In an embodiment, the shortened NRI expansion module utilizes at least one shortened NRI database, which includes a list of shortened NRIs and corresponding original NRIs, to correlate received shortened NRIs with corresponding original NRIs. The shortened NRI database may be stored in the memory 216 or in any other memory accessible by the shortened NRI expansion module. The shortened NRIs can be viewed as substitute or replacement NRIs of the original NRIs with fewer characters than the original NRIs. As an example, the original NRIs may include tens or hundreds of characters, e.g., more then 25 characters, while the shortened NRIs may include only few characters, e.g., less then 25 characters. As used herein, "characters" include alphanumeric characters and symbols. The shortened NRIs are generated so that requests for network resources from computing devices using the shortened NRIs are directed to the mediation system 106, e.g., the server 210. The shortened NRIs may be created by users or automatically created by a shortening algorithm, which are then included in the shortened NRI database. In an embodiment, the shortened NRIs may be encoded in QR codes, which are two-dimensional bar codes, so that the shortened NRIs can be extracted from the QR codes. Thus, in this embodiment, a user of a computing device is able to take a picture of a QR code with an encoded shortened NRI using the camera feature of the computing devices to extract the encoded shortened NRI from the QR code to make a request for network resources using the extracted shortened NRI. Upon receiving the requests for network resources using the shortened NRIs, the shortened NRI expansion module fetches the requested network resources using the original NRIs as specified in the shortened NRI database. In order to fetch the requested network resources, the shortened NRI expansion module generates and transmits requests for the network resources using the corresponding original NRIs in response to the received requests for the network resources from the computing devices using the shortened NRIs. In the embodiment in which the network 102 shown in FIG. 1 is the Internet, the shortened NRI expansion module is configured to provide Uniform Resource Locator (URL) shortening service allowing users to use shortened URLs instead of original URLs to access resources on the Internet, such as hypertext markup language (HTML) files, e.g., webpages, and multimedia contents. However, as used herein, network resources may be any type of resources that can be retrieved through the network 102, such as cascading style sheets (CSS) files, JavaScript files, extensible hypertext markup language (XHTML) files, extensible markup language (XML) files and wireless markup language (WML) files.

The link translating module 220 is configured to receive network resources from the network 102, which may have been requested by the shortened NRI expansion module 218 using the original NRIs, and to perform a link translating operation on the received network resources to translate or replace some or all original hyperlinks ("links") of NRIs in the received network resources into replacement links of NRIs. Thus, some or all original links of NRIs in a received network resource will be replaced with replacement links of NRIs by the link translating module. In some embodiments, the link translating operation performed by the link translating module involves selectively replacing original links for certain types of network resources embedded in the received network resources. For example, the link translating module may selectively not replace original links for at least some binary content, such as image files, Flash files, audio files, etc., embedded in a network resource. The replacement links are configured so that when a user clicks on a replacement link to request a network resource, that request is routed to the mediation system 106, e.g., the server 210. That is, the replacement links are configured to point back to the mediation system 106, e.g., the server 210. In some embodiments, the NRIs of the replacement links may be shortened NRIs, similar to the shortened NRIs for the shortened NRI service provided by the shortened NRI expansion module 218. If shortened NRIs are used for the replacement links, the NRIs of the original links in the received network resources and the corresponding shortened NRIs of the replacement links are listed in a replacement NRI database, which may also be stored in the memory 216 or any other memory accessible by the link translating module. In some embodiments, the replacement NRI database and the shortened NRI database may be combined in a single database that lists the shortened NRIs and the corresponding original NRIs, as well as the NRIs of the replacement links and the corresponding NRIs of the original links. In some embodiments, the NRIs of the replacement links may be modified NRIs that include rerouting NRIs affixed to the NRIs of the original links, e.g., http://linkrewritingproxy.com/www.original_website.com, where "linkrewritingproxy.com" is the rerouting NRI and "www.original_website.com" is the original NRI. The rerouting NRIs direct requests using the replacement links back to the mediation system 106, e.g., the server 210. In these embodiments, since the NRIs of the original links are embedded in the modified NRIs of the replacement links, the replacement NRI database is not needed.

In some embodiments, the link translating operation performed by the link translating module 220 involves injecting a piece of programming script, such as a piece of JavaScript using the <SCRIPT>tag, into a received network resource that will either perform the link replacement as the network resource is loaded by a browser of the requesting computing device or on the fly when a user clicks a particular link on the network resource. An advantage of this link translating operation is that the load on the mediation system 106 is reduced.

In the embodiments in which the network 102 shown in FIG. 1 is the Internet, the link translating module 220 may be configured to perform the link translating operations to essentially replace one or more original links of URLs embedded in a fetched network resource, such as a webpage, with replacement links of URLs.

Once the link translating module 220 has performed the link translating operation on the received network resources, the resulting network resources are transmitted to the computing devices 108 that have requested the network resources. Since the NRIs of the replacement links are not readily visible or are not yet replaced, the users of the computing devices will not notice any difference in the appearance of the received network resources. However, if a user clicks on or activates a link in a received network resource that has been replaced or will be replaced, a request for network resource is routed back to the mediation system 106, e.g., the server 210, as specified by the NRI of the activated link.

The fetching module 222 is configured to process requests for network resources from the computing devices 108 shown in FIG. 1 using the NRIs of the replacement links. In particular, the fetching module operates to receive the requests for network resources from the computing devices using the NRIs of the replacement links and to fetch the request network resources using the NRIs of the original links. The fetching module may utilize the replacement NRI database maintained by the link translating module to correlate the NRIs of the replacement links with the corresponding NRIs of the original links to fetch the requested network resources, if the NRIs of the original links cannot be extracted from the NRIs of the replacement links, e.g., the NRIs of the replacement links are shortened NRIs. As an example, when the fetching module receives a request for network resource using a shortened NRI of a replacement link, the fetching module uses the replacement NRI database to find the NRI of the original link that corresponds to the replacement link. Once the NRI of the original link is found, the fetching module fetches the requested network resource by sending a request for the network resource using the NRI of the original link. However, if the original NRI can be extracted from the NRI of the replacement link, the fetching module fetches the requested network resource by sending a request for the network resource using the original NRI extracted from the NRI of the replacement link. When the requested network resource is received by the mediation system 106, e.g., the server 210, the received network resource can then be processed by the link translating module 220 to perform the link translating operation to translate one or more links in the network resource, as described above. In this manner, requests for network resources from the computing devices are mediated by the mediation system as long as the initial requests for network resources were made using shortened NRIs or were routed to the mediation system. In the embodiment in which the network 102 shown in FIG. 1 is the Internet, the fetching module is configured to receive requests for network resources using the URLs of the replacement links and to fetch the network resources using the URLs of the original links.

The monitoring module 224 is configured to monitor network activities of the computing devices 108 using information from the shortened NRI expansion module 218 and the fetching module 222. Since requests for network resources from the computing devices using shortened NRIs are handled by the shortened NRI expansion module and requests for network resources from the computing devices using NRIs of replacement links are handled by the fetching module, the network activities of the computing devices can be monitored using the information from the shortened NRI expansion module and the fetching module, e.g., which websites were visited, how long did users of the computing devices stay at the websites, what types of network resources were accessed, etc. The monitoring module stores data regarding the monitored network activities of the computing devices so that the stored data can be used for various purposes.

The service providing module 226 is configured to provide one or more services to the computing devices 108, which may or may not involve using the data regarding the monitored network activities of the computing devices, which was gathered by the monitoring module 225. As an example, the service providing module may use the data regarding the monitored network activities of the computing devices to send targeted or customized advertisements, e.g., embedded in one or more requested network resources, to the computing devices based on the recent or historic network activities of the computing devices. As another example, the service providing module may use the data regarding the monitored network activities of the computing devices to send price comparison data on one or more items that were accessed by the computing devices at shopping websites. As another example, the service providing module may use the data regarding the monitored network activities of the computing devices to provide user analytics, i.e., information about the users based on the network activities of the users via the computing devices, to one or more requesting parties. Other examples include the service providing module being configured to (1) take action based on the network resource contents (e.g., underlining all phone numbers on a received webpage), (2) overlay user interface elements on top of the received network resource (e.g., overlaying a toolbar providing various kinds of functionality to the user), and (3) inject arbitrary JavaScripts or other types of programming scripts for client-side (browser) execution.

Since the mediation system 106 mediates requests for network resources beyond the first request for network resource using a shortened NRI, the mediation system is able gather much more information than one-click analytics gathered by most URL shortening service providers. The mediation system can continually monitor the network activities of the computing devices 108 as long as the initial requests for network resources are shortened NRIs supported by the mediation system 106 or NRIs of the replacement links translated by the mediation system. Thus, the mediation system can effectively provide additional services to the computing devices and/or entities based on the network activities of the computing devices monitored by the mediation system, and thus, control what is returned back to the computing devices.

Figure 3:
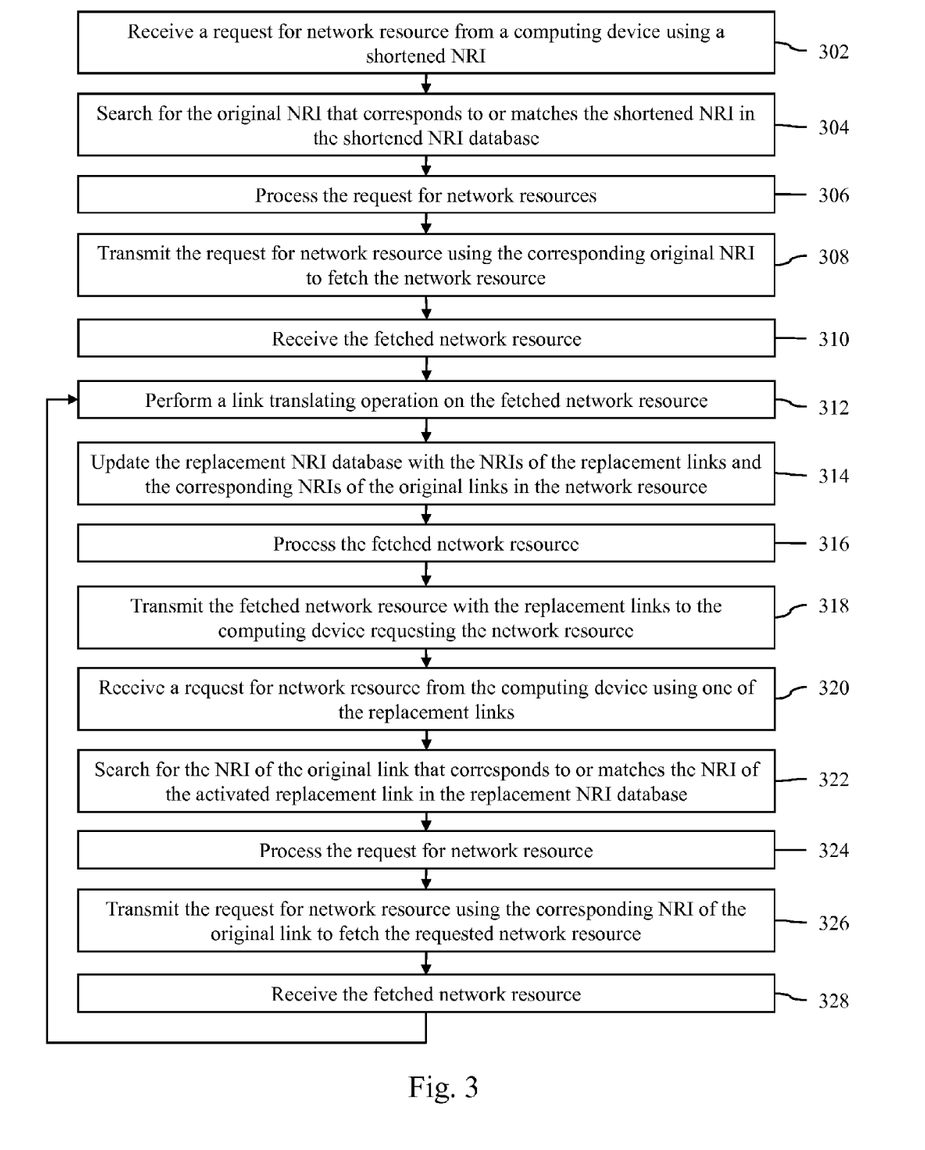
FIG. 3 is a process flow diagram of an exemplary operation of the mediation system in accordance with an embodiment of the invention.

An exemplary operation of the mediation system 106 is now described with reference to a process flow diagram of FIG. 3. At block 302, a request for network resource from a computing device, e.g., one of the computing devices 108, using a shortened NRI is received at the shortened NRI expansion module 218 of the mediation system 106. As an example, the shortened NRI is a shortened URL. Next, at block 304, the shortened NRI expansion module searches for the original NRI that corresponds to or matches the shortened NRI in the shortened NRI database. If the corresponding original NRI is not found in the shortened NRI database, an error message may be sent back to the requesting computing device. If the corresponding original NRI is found in the shortened NRI database, the operation proceeds to block 306. Next, at optional block 306, the request for network resource is processed to change the request, such as modifying an image file in the request, by the shortened NRI expansion module or the service providing module 226.

At block 308, the shortened NRI expansion module 218 transmits the request for network resource using the corresponding original NRI to the network 102 to fetch the network resource. Next, at block 310, the fetched network resource is received at the link translating module 220 of the mediation system 106. Next, at block 312, the link translating module performs a link translating operation on the fetched network resource to translate some or all of the original links in the fetched network resource and/or other NRIs embedded in the fetched network resource. The link translating operation may involve selectively replacing original links or NRIs for certain types of network resources embedded in the fetched network resource or injecting a piece of programming script, such as a piece of JavaScript using the <SCRIPT>tag, into the fetched network resource that will either perform the link replacement as the network resource is loaded by a browser of the requesting computing device or on the fly when a user clicks a particular link on the network resource.

Next, at optional block 314, the link translating module 220 updates the replacement NRI database with the NRIs of the replacement links and the corresponding NRIs of the original links in the network resource, if the NRIs of the original links cannot be extracted from the NRIs of the replacement links. Next, at another optional block 316, the fetched network resource is processed to change the fetched network resource, such as underlining phone numbers, collecting data, overlaying a toolbar on top of the page, injecting arbitrary JavaScript, etc., by the link translating module or the service providing module 226.

Next, at block 318, the link translating module 220 transmits the fetched network resource with the replacement links or the injected programming script to the computing device requesting the network resource. If one of the links in the transmitted network resource that has been replaced or will be replaced by the programming script is subsequently clicked or activated, the operation continues as follows.

At block 320, a request for network resource from the computing device using one of the replacement links is received at the fetching module 222 of the mediation system 106. Next, at optional block 322, the fetching module searches for the NRI of the original link that corresponds to or matches the NRI of the activated replacement link in the replacement NRI database, if the NRI of the original link cannot be extracted from the NRI of the replacement link, e.g., the NRI of the replacement link is a shortened NRI. If the corresponding NRI of the original link is not found in the replacement NRI database, an error message may be sent back to the requesting computing device. If the corresponding NRI of the original link is found in the replacement NRI database, the operation proceeds to block 324. Next, at optional block 324, the request for network resource is processed to change the request by the fetching module or the service providing module 226.

At block 326, the fetching module 222 transmits a request for network resource using the corresponding NRI of the original link to the network 102 to fetch the requested network resource. Next, at block 328, the fetched network resource is received at the link translating module 220 of the mediation system 106. The operation then proceeds back to block 312, where the fetched network resource is processed in the same manner as described above with respect to the network resource that was fetched in response to a request for network resource using a shortened NRI. As the mediation system 106 processes requests for network sources and fetched network resources for computing devices, the network activities of the computing devices based on the requests and the fetched network resources are monitored and stored so that the service providing module 226 can provide various other services to the computing devices and/or entities, as well as control the resources transmitted back to the computing devices.

Although the shortened NRI expansion module 218, the link translating module 220, the fetching module 222, the monitoring module 224 and the service providing module 226 have been illustrated and described as being separate components, two or more of these module may be combined or integrated in other embodiments. As an example, in some embodiments, the fetching module may be incorporated into the shortened NRI expansion module such that the shortened NRI expansion module performs all the functions of the fetching module, as well as all the functions of the shortened NRI expansion module described above. In other embodiments, some of the functions of the shortened NRI expansion module, the link translating module, the fetching module, the monitoring module or the service providing module may be performed by one or more additional modules.

Figure 4:
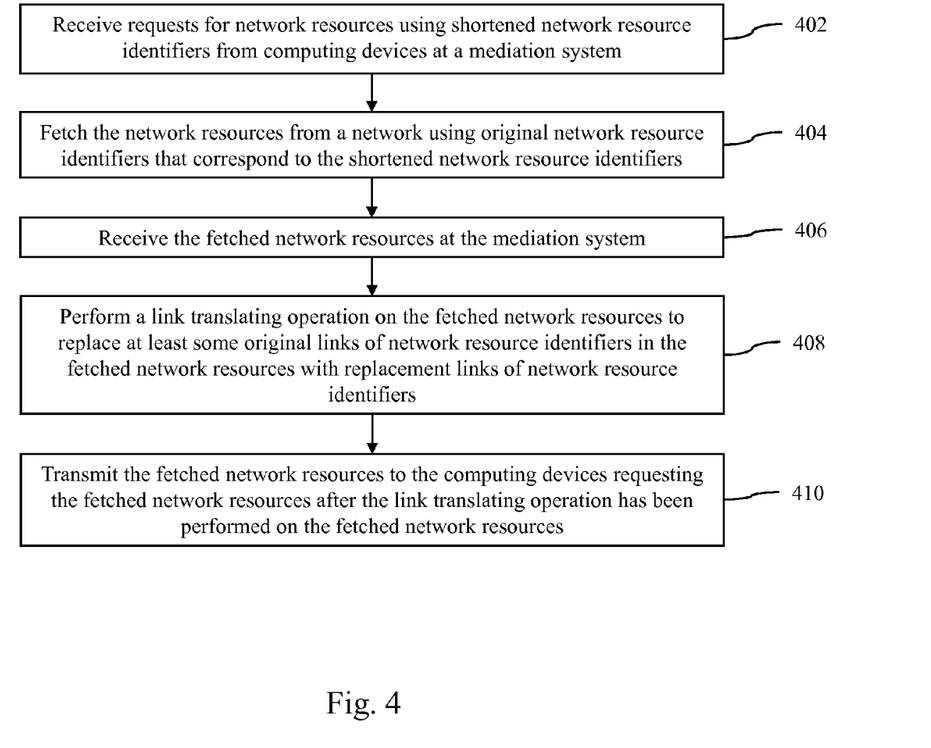
FIG. 4 is a flow diagram of a method for providing network resource identifier shortening service to computing devices in accordance with an embodiment of the invention.

A method for providing shortened NRI service to computing devices in accordance with an embodiment of the invention is described with reference to a flow diagram of FIG. 4. At block 402, requests for network resources using shortened NRIs from the computing devices at a mediation system that includes at least one server are received. At block 404, the network resources are fetched from a network using original NRIs that correspond to the shortened NRIs. At block 406, the fetched network resources are received at the mediation system. At block 408, a link translating operation is performed on the fetched network resources to replace at least some original links of NRIs in the fetched network resources with replacement links of NRIs. The replacement links of replacement network resource identifiers are configured to direct requests for network resources from the computing devices using the replacement links to the mediation system for processing so that network activities of the computing devices can be monitored. At block 410, the fetched network resources are transmitted to the computing devices requesting the fetched network resources after the link translating operation has been performed on the fetched network resources.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for providing network resource identifier shortening service to a computing device, the system comprising:
at least one server operably connected to the computing device and a network, the at least one server being configured to process data transmissions between the computing device and the network, the at least one server comprising:
a shortened network resource identifier expansion module configured to receive a request for a network resource using a shortened network resource identifier from the computing device and to fetch the network resource using a first original network resource identifier that corresponds to the shortened network resource identifier; and
a link translating module operably connected to the shortened network resource identifier expansion module, the link translating module being configured to receive the fetched network resource, the fetched network resource including a plurality of second original network resource identifiers, and to perform a link translating operation on the fetched network resource to selectively replace a subset of the second original network resource identifiers with replacement network resource identifiers, the subset comprising some but not all of the second original network resource identifiers such that at least one of the second original network resource identifiers remains in the fetched network resource after the link translating operation, the replacement network resource identifiers being configured to direct requests for network resources from the computing device using the replacement network resource identifiers to the at least one server for processing so that network activities of the computing device can be monitored or controlled, the fetched network resource being transmitted to the computing device requesting the fetched network resource after the link translating operation has been performed on the fetched network resource.

2. The system of claim 1, wherein the shortened network resource identifier expansion module is configured to receive the request for a network resource using a shortened Uniform Resource Locator (URL) from the computing device and to fetch the network resource using a first original URL that corresponds to the shortened URL, and wherein the link translating module is configured to receive the fetched network resource, the fetched network resource including a plurality of second original URLs, and to perform the link translating operation to selectively replace the subset of the second original URLs with replacement URLs.

3. The system of claim 1, wherein the fetched network resource includes at least one of hypertext markup language (HTML) files, cascading style sheets (CSS) files, JavaScript files, extensible hypertext markup language (XHTML) files, extensible markup language (XML) files and wireless markup language (WML) files.

4. The system of claim 1, wherein the link translating module is configured to perform the link translating operation that includes replacing the subset of the second original network resource identifiers in the fetched network resource with the replacement network resource identifiers.

5. The system of claim 1, wherein the link translating module is configured to perform the link translating operation that includes injecting a programming script into the fetched network resource to replace the subset of the second original network resource identifiers in the fetched network resource with the replacement network resource identifiers at the computing device.

6. The system of claim 1, further comprising a fetching module operably connected to the link translating module, the fetching module being configured to receive a second request for a network resource using one of the replacement network resource identifiers from the computing device and to fetch the network resource associated with the second request using the second original network resource identifier that corresponds to the one of the replacement network resource identifiers.

7. The system of claim 1, wherein the shortened network resource identifier expansion module is further configured to receive a second request for a second network resource using one of the replacement network resource identifiers from the computing device and to fetch the second network resource associated with the second request using the second original network resource indicator that corresponds to the one of the replacement network resource indicators.

8. The system of claim 7, further comprising a monitoring module operably connected to the shortened network resource identifier expansion module, the monitoring module being configured to monitor the network activities of the computing device based on at least the shortened network resource identifier, the replacement network resource identifier, the network resource and the second network resource.

9. The system of claim 1, further comprising a service providing module operably connected to the shortened network resource identifier expansion module and the link translating module, the service providing module being configured to modify the fetched network resource to control what is transmitted back to the computing device requesting the fetched network resource.

10. A method for providing network resource identifier shortening service to a computing device, the method comprising:
receiving a request for a network resource using a shortened network resource identifiers from the computing device at a system that includes at least one server;
fetching, by the system, the network resource from a network using a first original network resource identifier that corresponds to the shortened network resource identifiers;
receiving the fetched network resource at the system, the fetched network resource including a plurality of second original network resource identifiers;
performing, by the system, a link translating operation on the fetched network resource to selectively replace a subset of the second original network resource identifiers in the fetched network resource with replacement network resource identifiers, the subset comprising some but not all of the second original network resource identifiers such that at least one of the second original network resource identifiers remains in the fetched network resource after the link translating operation, the replacement network resource identifiers being configured to direct requests for network resources from the computing device using the replacement network resource identifiers to the system for processing so that network activities of the computing device can be monitored or controlled; and transmitting, by the system, the fetched network resource to the computing device requesting the fetched network resource after the link translating operation has been performed on the fetched network resource.

11. The method of claim 10, wherein the receiving the request for a network resource using the shortened network resource identifiers includes receiving a shortened Uniform Resource Locator (URL) from the computing device at the system, and wherein the fetching the network resource from the network using the first original network resource identifier includes fetching the network resource from the network using a first original URL that corresponds to the shortened URL.

12. The method of claim 10, wherein the fetched network resource include at least one of HTML files, CSS files, JavaScript files, XHTML files, XML files and WML files.

13. The method of claim 10, wherein the performing the link translating operation includes replacing the subset of the second original network resource identifiers in the fetched network resource with the replacement network resource identifiers.

14. The method of claim 10, wherein the performing the link translating operation includes injecting a programming script into the fetched network resource to replace the subset of the second network resource identifiers in the fetched network resource with the replacement network resource identifiers at the computing device.

15. The method of claim 10, further comprising:
receiving a second request for a second network resource using one of the replacement network resource indicators from the computing device; and
fetching the network resource associated with the second request using the second original network resource indicator that corresponds to the one of the replacement network resource indicators.

16. The method of claim 15, further comprising monitoring the network activities of the computing device based on at least the shortened network resource identifier, the replacement network resource identifier, the network resource and the second network resource.

17. The method of claim 10, further comprising modifying the fetched network resource to control what is transmitted back to the computing device.

18. A method for providing Uniform Resource Locator (URL) shortening service to a computing device, the method comprising:
receiving a request for a network resource using a shortened URL from the computing device at a system that includes at least one server;
fetching, by the system, the network resource from a network using a first original URL that corresponds to the shortened URLs;
receiving the fetched network resource at the system, the fetched network resource including a plurality of second original URLs;
performing, by the system, a link translating operation on the fetched network resource to selectively replace a subset of the second original URLs in the fetched network resource with replacement URLs, the subset comprising some but not all of the second original URLS such that at least one of the second original URLs remains in the fetched network resource after the link translating operation, the replacement URLs being configured to direct requests for network resources from the computing device using the replacement URLs to the system for processing so that network activities of the computing device can be monitored or controlled; and
transmitting, by the system, the fetched network resource to the computing device after the link translating operation has been performed on the fetched network resource.

19. The method of claim 18, wherein the performing the link translating operation includes replacing the subset of the second original URLs in the fetched network resource with the replacement URLs.

20. The method of claim 18, wherein the performing the link translating operation includes injecting a programming script into the fetched network resource to replace the subset of the second original URLs in the fetched network resources with the replacement URLs at the computing device.

21. The system of claim 1, wherein the subset comprises second original network resource identifiers referring to non-binary content.

22. The method of claim 10, wherein the subset comprises second original network resource identifiers referring to non-binary content.

* * * * *